Nov. 10, 1959   M. SHIMRAT   2,911,742
EDUCATIONAL APPLIANCE
Filed Feb. 20, 1958   2 Sheets-Sheet 1
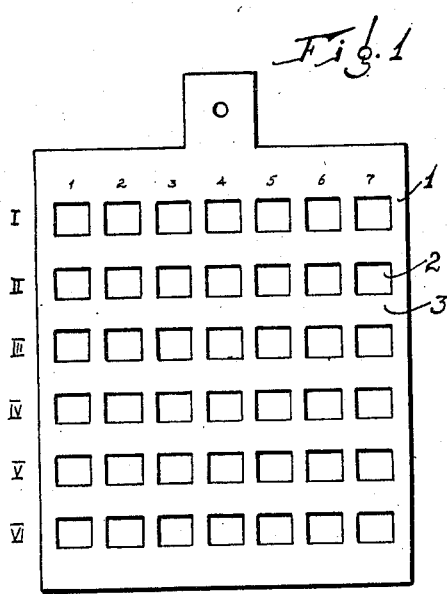
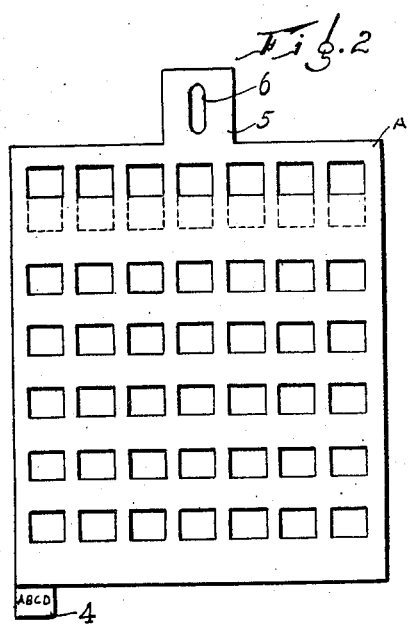
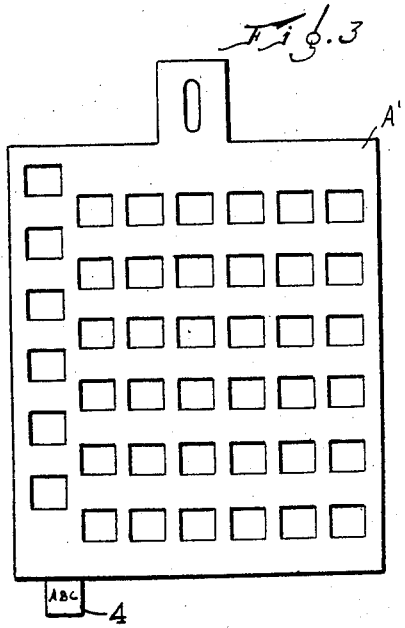
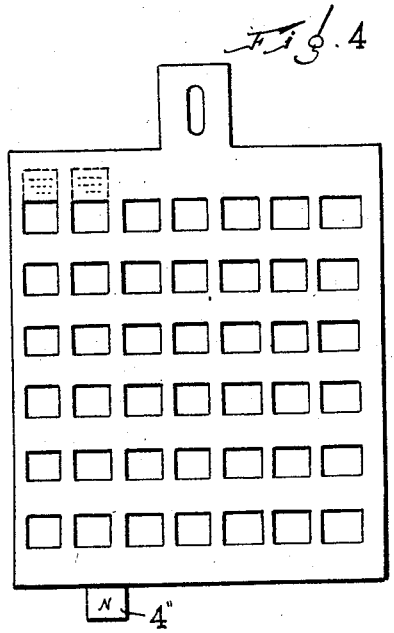
Inventor
Moshe Shimrat
By Michael S. Striker
Attorney Inventor
Moshe Shimrat
By Michael S. Striker
Attorney — # United States Patent Office 2,911,742
Patented Nov. 10, 1959

2,911,742
EDUCATIONAL APPLIANCE
Moshe Shimrat, Talbie, Jerusalem, Israel

Application February 20, 1958, Serial No. 716,464

Claims priority, application Israel March 11, 1957

12 Claims. (Cl. 35—9)

This invention relates to an educational appliance serving for looking up words, figures or images, which can be defined by two or more symbols, such as letters, numerals, colours or the like. Such appliance, therefore, can serve as a word dictionary, picture reckoner, question-and-answer game or the like.

The invention has the object to provide an appliance as aforesaid which can be operated by the simple selection of the different symbols by drawing correspondingly marked tabs in a similar manner, whereby the derived result becomes readable in a window cleared by the selecting operation.

The invention consists in an educational appliance for looking up words, figures or images definable by two or more symbols coordinated in groups, comprising a stack including cards individually movable laterally back and forth relative to the stack through a fixed distance and grouped within the stack in as many groups as there are symbols to which these are coordinated, the lowermost group (the base) carrying the words, figures, or images to be looked up, the movable cards being marked with the symbols to which the cards are coordinated in order to enable the selection of the proper card, and having equal numbers of apertures disposed in ideally the same basic pattern on all cards with equal distances (bridges) between them in the moving direction, which pattern however is deviated from on each single card by the displacement of at least one aperture in the moving direction by said fixed distance, so that in one position, the inoperative state of the appliance each window formed by the registering apertures of all the cards is blocked by some not-apertured or bridge part of at least one card of each group and by the movement of one card of each group through the fixed distance into another position, the operative state of the appliance one such window is cleared and the word, figure, or image marked on a card of the base and corresponding to the selected symbols is cleared and appears uncovered therein.

Two appliances according to the invention are illustrated, by way of example only and in a diagrammatic manner, in the accompanying drawings in which:

Fig. 1 shows the cover card of an appliance according to a first embodiment of the invention.

Fig. 2 shows a card of the top group thereof;

Fig. 3 shows a card of the median group thereof;

Fig. 4 shows a card of the bottom group thereof;

Figure 5:
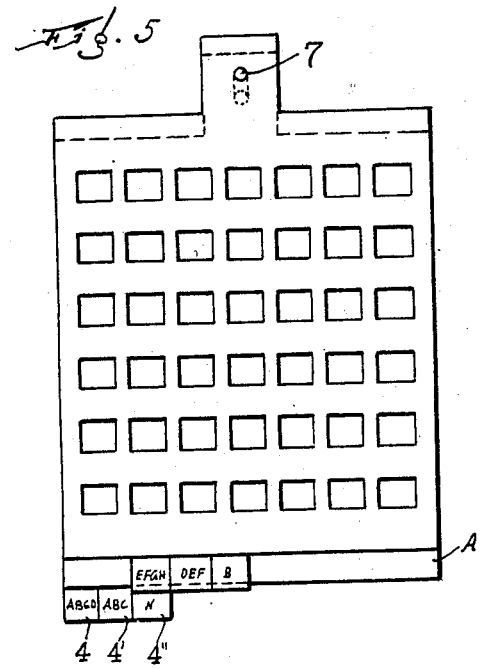
Fig. 5 is a plan view of the appliance as a whole with one card of each group drawn out.

The appliance shown in Figs. 1–5 is a dictionary in which the words of the key language are defined by triads of symbols being the first three letters, that is a group of symbols, and, when these are selected, the corresponding word of the other language appears in the window thus cleared.

The dictionary comprises a stack of cards 1 fixed to a back plate (not shown) by proper connecting means so designed that the stack cannot be taken apart and the cards have no other freedom of movement relative to one another than by way of being drawn out at the bottom over a limited path and of being pushed back into the original state as will be described below. Each card has forty-two rectangular apertures 2, arranged in horizontal and vertical alignment in six rows I–VI and seven columns 1–7. All the apertures 2 have the same length, and the distance 3 between two apertures of the same column, that is the height of the bridge left in the card, is equal to that length. The bridges are referred herein by the place number of the aperture next below with the addition of a prime, e.g. (II—1)' above the aperture II—1, and so forth. The cards have at their bottom edges tabs 4 on which appear the symbols forming part of the triad to which each particular card corresponds.

The cards are secured to the back plate by means of a pin or rivet 7 fixed to a tongue integral with the top edge of the back plate and extending through oblong longitudinal slots 6 made in corresponding tongues 5 of the cards and have a length equal to the height of aperture 2. No such slot is made in the tongue 5 of the cover where the pin 7 is anchored immovably. Accordingly all the cards except the cover can be drawn out from the bottom end by a length (the "fixed distance") equal to the individual height of the apertures and bridges, and be pushed back similarly.

It is, of course, not necessary that the "fixed distance" be equal to the height of the apertures and bridges. The apertures may be shorter than the fixed distance, in which case the bridges will be correspondingly longer.

The cards are arranged in three groups corresponding to the three positions of the letters in the triads by which the words of the key language are defined, and each group of cards covers the entire alphabet.

The top group, corresponding to the first letter of the triade comprises six cards: card A for the letters a, b, c, d; card B, not visible, for the letters e, f, g, h, and so on. Each other card shows on its tab 4 the letters to which it is coordinated. Thus, the tab 4 of card A visible in Figs. 2 and 5 is marked with the letters a, b, c, d; the remaining five tabs of the top group cards have been omitted in order not to encumber the drawing.

The median group, corresponding to the second letter of the triad, comprises seven cards: Card A', visible in Fig. 3, for the letters a, b, c, with tab 4'; card B', not visible, for the letters d, e, f, and so on.

The bottom group corresponds to the last letter of the triad; it comprises twenty-six cards, each card for one letter of the alphabet, as shown on tab 4" of Figs. 4 and 5.

In the cover 1 as well as in the bottom group of cards shown in Fig. 4 all the apertures are arranged in a regular pattern.

In each card of the top group one row of apertures is displaced towards the top edge by the width of one bridge, being a different row for each card of this group, as follows:

Card A: the top row I—I to I-7 is displaced while the other apertures remain in regular position. Thereby, the bridges (II–1)'—(II–7)' are doubled in height. Card B: the second row II–1 to II–7 is displaced while the other apertures remain in regular position. Thereby, the bridges (II–1)'—(II–7)' are eliminated and the apertures of row II merge into the apertures of row I. On the other hand the bridges (III–1)'—(III–7)' are doubled. And so forth for the whole group.

In the cards of the median group one column of apertures in each card is displaced towards the top edge by the height of an aperture, being a different column for each card of this group, as follows:

First card A': the column 1 is displaced while the other apertures remain in regular position.

Second card B' (not visible): the column 2 is displaced while the other apertures remain in regular position; and so on.

All the staggered apertures in both top and median groups are out of register with the apertures of the cover and of the cards of the base group. Accordingly, there is no throughgoing top-to-bottom window through the entire stack as the apertures in normal positions are covered by the bridges next below the staggered apertures. When one card of the top group and one card of the median group is drawn, the staggered apertures of both cards are in register with the normal apertures of all cards, while the normal apertures of both drawn cards are now out of register with the normal apertures of all other cards. Potential throughgoing windows now exist at the places of the staggered apertures of both drawn cards. However, these staggered apertures of the two drawn cards are again out of register with one another except for one single aperture of either card. Here, then, does a window really open. When now a card of the bottom group is also drawn, the apertures of this card are displaced out of register with the normal apertures of the other cards. Therefore, in the window opened through the cards of the top and median groups, a bridge of the drawn bottom card becomes visible and the word of the second language found on this bridge is the one looked for.

In the use of the appliance as a dictionary the "Found" word will be the translation of the word whose first three letters are "fed" into the appliance and the original word may be printed beside the translation. As will be explained in detail below, a choice of several words will as a rule appear in the same window.

Fig. 5 shows the selection of a word whose first letter may be a, b, c, or d, the second letter a, b, or c, and the third letter n. For example, in order to find the translation of "ban," first the card of the top group is drawn whose tab has the letter "b." The bridges of this card then cover all the apertures of the cover except apertures I–1 to I–7. Then one draws the card of the median group whose tab include the letter "a." The bridges (I–2)' to (I–7)' of this card then cover the apertures I–2 to I–7 of the cover, while the only aperture that remains uncovered is aperture I–1. Therefore aperture I–1 is the only one in register in both drawn cards and this is now the place of the window where the reading will take place. Next one draws the card of the bottom group whose tab shows the letter "n." This card contains on its bridges all the words the third letter of which is "n," with a group of such words on each bridge. But only its bridge (I–1)' comes into register with the coinciding apertures I–1 of the cover and of the drawn cards of the top and the median group and thus the translation of "ban" can be chosen from the groups of words appearing in this aperture. This group may include, for example, translations of such words as "banner," "can," "Danger." In this way the drawn cards of the top group and of the median group serve for preselecting and creating a window in which that bridge of the card of the lowermost group will appear, when drawn, which carries the word looked for. It is obvious that the dictionary will have to be restricted to a choice of several words, out of the group of words beginning with a combination of these letters. However, some additional indications appearing together with the word or image will have to guide the user to the correct word, for example the selected word of the key language may be repeated on the bottom card beside the sought for word of the second language.

In order to return the appliance into the inoperative position the cards are pushed back into the stack. To facilitate this operation special means may be provided such as a throughgoing elongated slot in all the cards through which a stylus or the like can be inserted.

Figure 6:
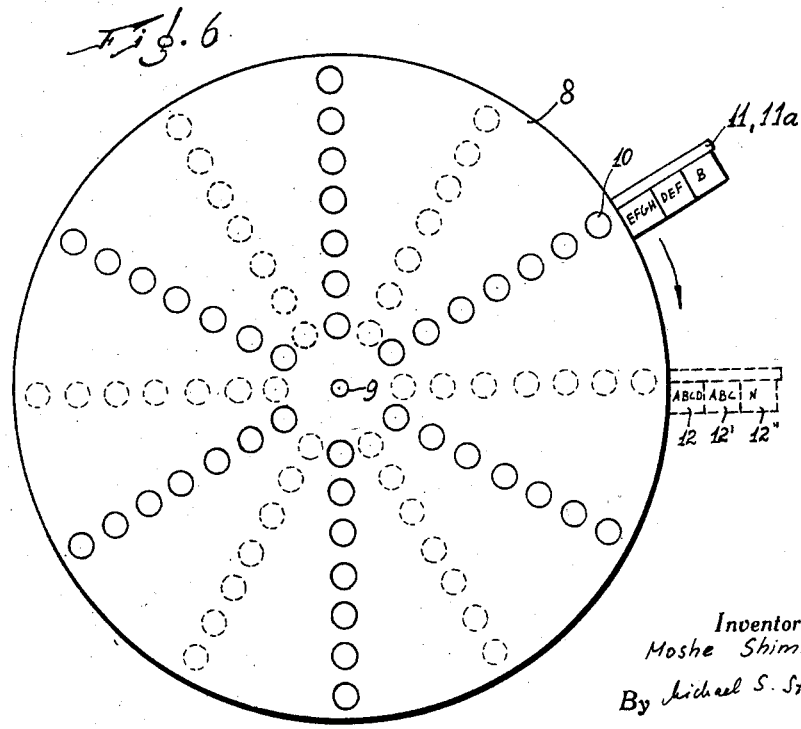
Fig. 6 is a plan view of an appliance according to a second embodiment of the invention.

The appliance illustrated in Fig. 6, equally represented as a dictionary, comprises a stack of circular cards 8 mounted on a back plate (not shown) and connected at their centers by a pin 9 so that each card can be turned relative to the other cards of the stack clockwise into the operative position and counter-clockwise into the starting position. Each card has forty-two circular apertures 10 arranged in a basic pattern on six radii, equally spaced from one another by 60° and seven equally spaced concentric circles. Each card has a radial extension 11, 11a etc., to which tabs 12, 12' etc. are fixed. The latter carry the letters of groups of letters to which each card corresponds. For the sake of convenience, the radial row of apertures leading up to the extension 11 of the first card of the first group is called herein the "first row," the next row in clockwise direction—the "second row" etc.

As described with respect to Figs. 1–5, a group of cards is coordinated to each position of the letters of the triad, each group covering the entire alphabet. The radial rows of apertures here correspond to the transverse rows of the first embodiment, while the concentric circles correspond to the vertical columns. In the first card of the first group, the first row of apertures 10 is staggered counter-clockwise by 30° while all the other apertures remain in the position of the basic pattern so that the angular distance between the first and second radial rows is increased to 90°, that between the first and sixth row is decreased to 30°. In the second card of this group the second row of apertures is similarly staggered by 30° in counter-clockwise direction, i.e. towards the first row. and so on.

In the first card of the median group all the apertures which lie on the concentric circle closest to the center of the cards are staggered in counter-clockwise direction by 30°; in the second card it is the apertures lying on the next outer concentric circle that are staggered by 30° and so on.

In the cards of the base group, as well as in the cover card, all the apertures are disposed according to the basic pattern.

In this embodiment of the invention the selection of the appropriate letter is effected by turning the card on whose tab the letter appears, by 30° in clockwise direction, first the card of the top group for the letter in the first position of the triad, then the card of the median group for the middle letter, finally the card of the base group for the last letter. By the displacement of the top and median cards, one single window opens and by this displacement the sought-for translation printed on the card of the base group is made to appear in this window.

In order to eliminate the possibility that, when one card is drawn out from the stack, it takes with it the one card lying on top of it and/or the one lying beneath it, card separators can be provided in between each card and the one below it. The card separators will have apertures according to the basic pattern and will not be movable, but will be fixed in the same manner as the cover card.

I claim:

1. An educational appliance for looking up indicia coordinated by groups definable by a plurality of symbols, comprising a stack including cards individually movable laterally back and forth relative to the stack through a fixed distance and grouped in as many groups as there are any of said symbols to which these are coordinated, the base group carrying the indicia to be looked up, the movable cards being marked with a number of said symbols to which the cards are coordinated in order to enable the selection of the proper card, and having equal numbers of apertures disposed in the same basic pattern on all cards with equal distances between them in the moving direction, which pattern is deviated from on each single card by the displacement of at least one aperture in the moving direction by said fixed distance, so that in one position of the appliance each aperture of all the cards is blocked by some not-apertured part of at least one card of each group and, by the movement of one card of each group through the fixed distance into another position of the appliance, one such aperture is cleared and the indicia marked on a card of the base and corresponding to the selected symbols is cleared and appears uncovered therein.

2. An educational appliance as claimed in claim 1, including a cover card having apertures disposed in the ideal basic pattern.

3. An educational appliance as claimed in claim 1, in which each card of the base group contains at least one more symbol than each card of the other groups containing deviating patterns.

4. An educational appliance as claimed in claim 1, wherein the cards are rectangular and adapted to be drawn out of the stack at one edge thereof.

5. An educational appliance as claimed in claim 1, wherein the word to be looked for is defined by three symbols and the stack of cards is divided into three groups.

6. An educational appliance as claimed in claim 1, wherein a fixed card, having apertures disposed in the ideal basic pattern is provided between each card and the one lying next to it.

7. An educational appliance as claimed in claim 1, wherein the cards are circular and turnably connected to each other at their centers, and the fixed moving distance is an angular measure.

8. An educational appliance as claimed in claim 5, wherein the basic pattern is constituted by the apertures arranged in rows and columns.

9. An educational appliance as claimed in claim 7, wherein the basic pattern is constituted by the apertures arranged on radii with equal angular distances between them and on equally spaced concentric circles.

10. An educational appliance as claimed in claim 8, wherein in each card of the first group of cards, corresponding to the first symbol, one row of apertures is staggered by the fixed distance and in each card of the second group of cards, corresponding to the second symbol, the apertures of one column are staggered by the fixed distance, the base cards corresponding to the third symbol.

11. An educational appliance as claimed in claim 9, wherein the words to be looked for are defined by three symbols and the stack of cards is divided into three groups.

12. An educational appliance as claimed in claim 11, wherein in each card of the first group, corresponding to the first symbol, the apertures lying on one radius are staggered by the fixed distance, and in each card of the second group of cards, corresponding to the second symbol the apertures lying on one concentric circle are staggered by the fixed distance.

References Cited in the file of this patent

UNITED STATES PATENTS

| | | |
|---|---|---|
| 1,867,888 | Obidine | July 19, 1932 |
| 2,493,668 | Gonzalez | Jan. 3, 1950 |
| 2,503,130 | Poritz | Apr. 4, 1950 |